United States Patent [19]

Latham et al.

[11] 4,086,778
[45] May 2, 1978

[54] SUBSEA CONNECTION UNIT

[75] Inventors: Raymond E. Latham, Houston, Tex.; Bernard P. Usquin, London, England

[73] Assignee: Mobil Oil Corporation, New York, N.Y.

[21] Appl. No.: 757,262

[22] Filed: Jan. 6, 1977

[51] Int. Cl.² ........................ F16L 1/00; E21B 43/01
[52] U.S. Cl. ........................................ 61/110; 29/429; 166/.6; 285/137 A; 285/340
[58] Field of Search ............... 61/110, 111, 109, 108; 166/.5; 285/137, 340; 137/594

[56] References Cited
U.S. PATENT DOCUMENTS

| | | | |
|---|---|---|---|
| 3,592,014 | 7/1971 | Brown | 61/110 |
| 3,695,350 | 10/1972 | Petersen | 166/.5 |
| 3,710,859 | 1/1973 | Hanes et al. | 166/.6 |
| 3,918,485 | 11/1975 | Weber | 285/137 A |

Primary Examiner—Jacob Shapiro
Attorney, Agent, or Firm—C. A. Huggett; Drude Faulconer

[57] ABSTRACT

A subsea connection unit for remotely connecting a first flowline to a complementary second flowline at a submerged location. The unit is comprised of a connector assembly which is attached to the end of the first flowline and a base structure adapted to be positioned on the marine bottom and to hold the end of the second flowline. A pulldown line is attached to the connector assembly and extends downward through the base structure and back to the surface. As the first flowline is pulled downward to the marine bottom, a guide cone on the connector assembly is pulled into a cone receiver on the base structure to properly align the two flowlines. A special guide assembly on the base structure insures that the guide cone will enter the cone receiver. Fluid actuated means on the connector assembly (1) locks the connector assembly to the base structure; (2) moves the end of the first flowline into abutment with the end of the second flowline; (3) closes a clamp means carried by said connector assembly to secure the ends of the two flowlines together; and (4) releases the pull-down line.

25 Claims, 8 Drawing Figures

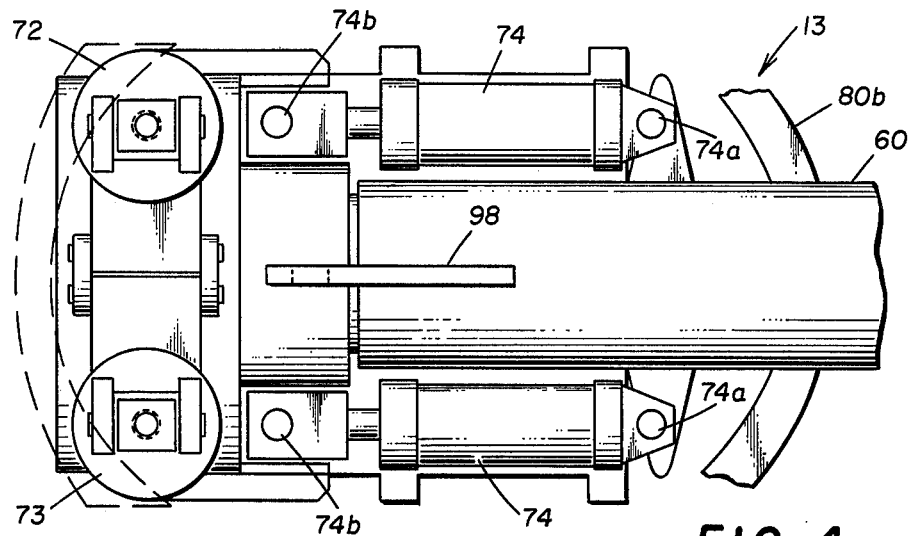
FIG. 4
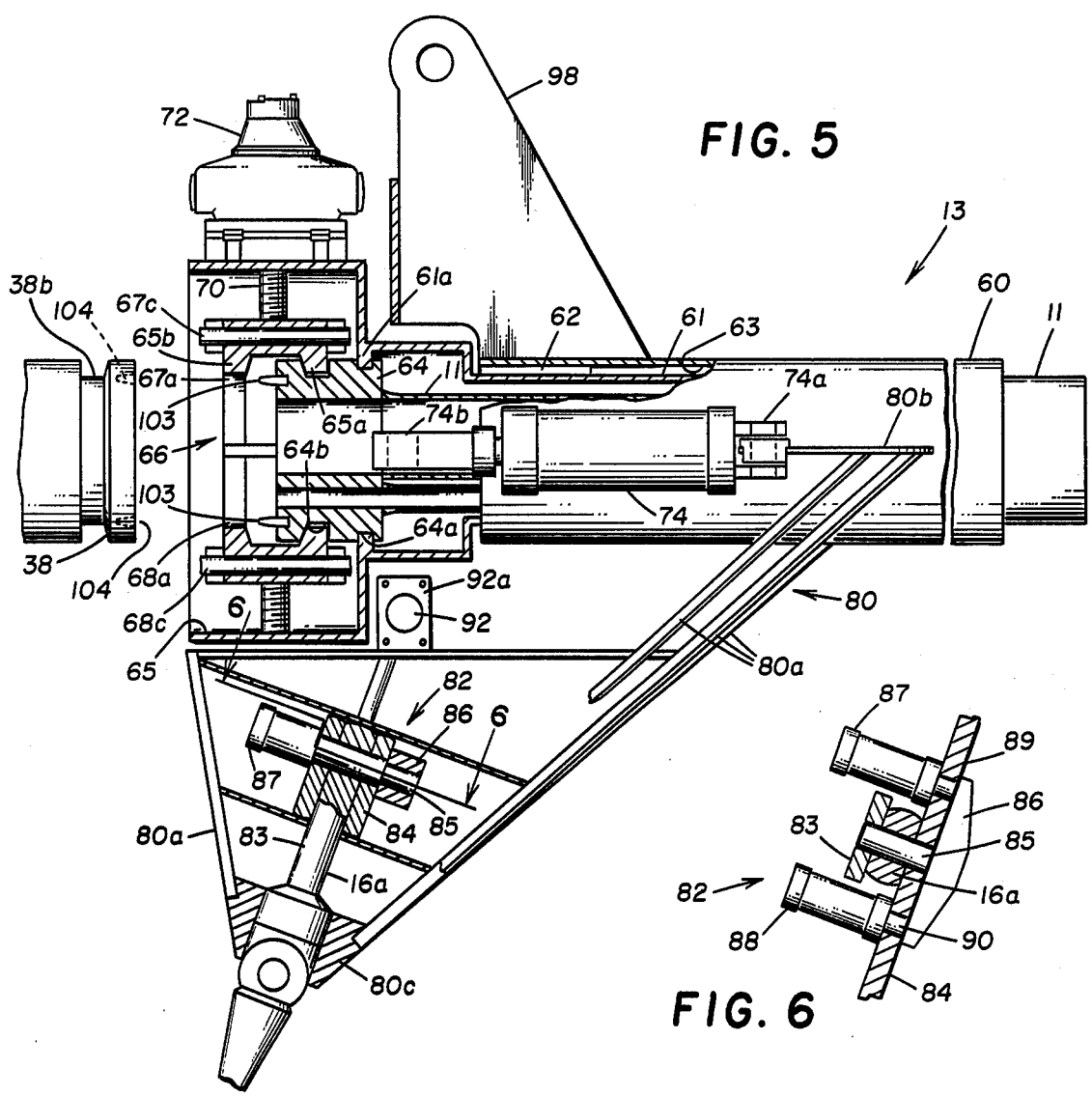
FIG. 5
FIG. 6

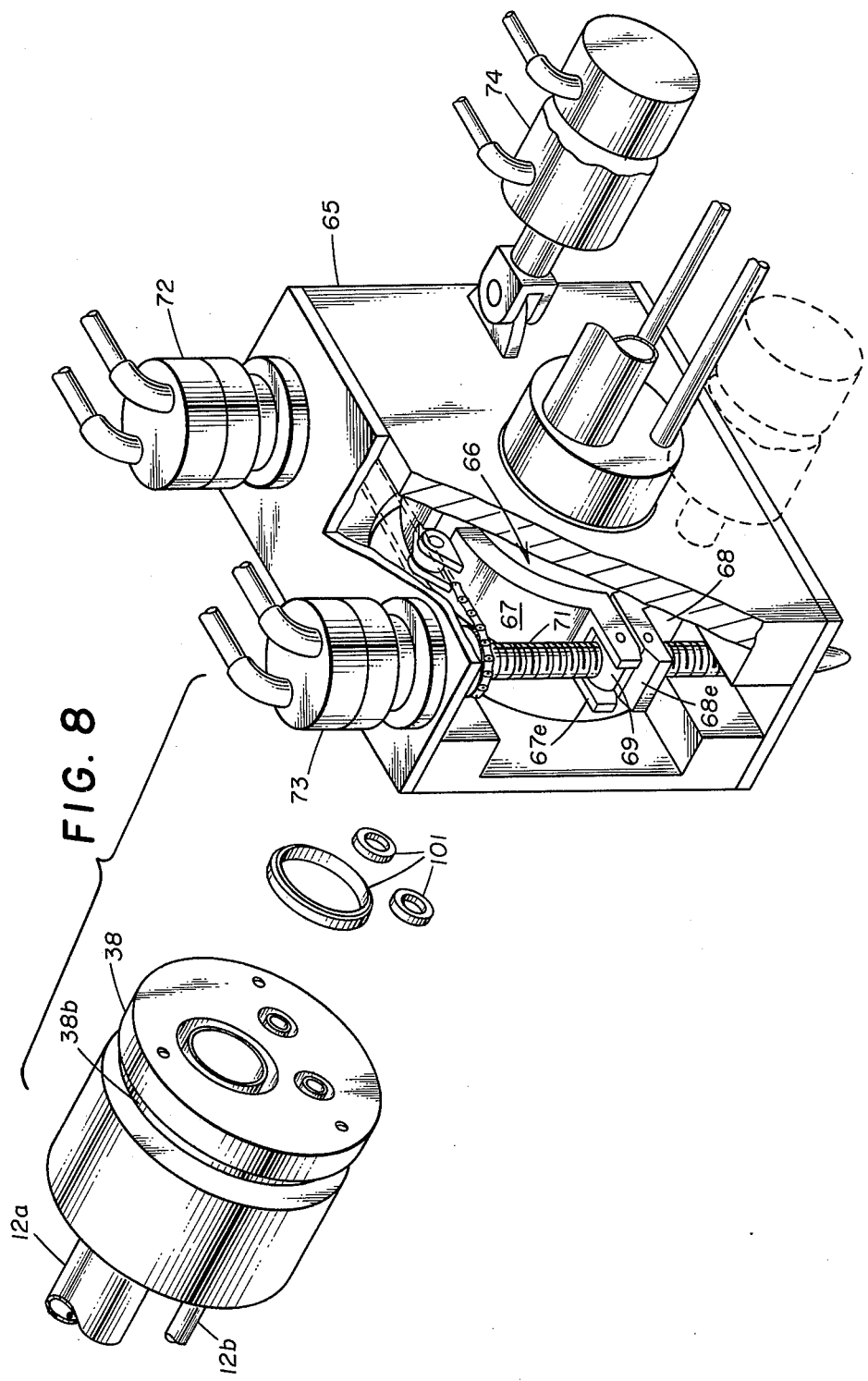

SUBSEA CONNECTION UNIT

BACKGROUND OF THE INVENTION

This invention relates to a subsea connection unit and more particularly relates to a subsea connection for remotely connecting flow conduits at a submerged location.

As the production of hydrocarbons from offshore deposits moves into deeper waters, the problems of providing the necessary submerged flowlines increase. Included in these problems is that of making the required connections between flow conduits at submerged locations, e.g., (1) connecting flowlines to submerged wellheads, (2) connecting submerged manifolding centers to submerged well heads, and (3) connecting submerged flowlines to other flowlines, etc. Where the water depth reaches that at which divers can no longer effectively operate, such connections must be made either by a submerged work vessel or, more preferably, by a remote connector controllable from the surface.

A typical example of a technique in which it is desirable to remotely connect flowlines at a submerged location is described in U.S. Pat. No. 3,698,348. In such a technique, a length of a flowline or a flowline bundle is to be installed between two submerged flow terminal structures, e.g., between a manifold station and a base for a riser, between a wellhead and a manifold station, between the ends of two previously laid flowlines or flowline bundles, or between any two like structures. The length of flowline or flowline bundle, which may extend for several miles, is assembled onshore and towed to the installation site. With proper buoyancy and tension being maintained on the length of flowline, the ends of the length of flowline are drawn downward into position with reference to the submerged flow terminal structures and are connected thereto.

Where this installation technique is carried out in deep water, it is desirable to use connectors which are capable of being controlled remotely from the surface. Also, since the length of flowline may be installed at time substantially later than that at which the submerged flow terminals are positioned on the marine bottom, it is desirable to have all the necessary actuating mechanisms for effecting the connection located on the ends of the flowline being installed as opposed to being located on the flow terminals. This eliminates the need for maintaining the necessary communication links between the actuating means and the surface for long periods of time before the desired connections are actually made.

SUMMARY OF THE INVENTION

The present invention provides a subsea connection unit capable of remotely connecting a flowline or bundle of flowlines to a complementary flowline or bundle of flowlines at a submerged location wherein the actuating means for making the connection and the controls therefor are located on and lowered with the flowline or bundle of flowlines being installed.

Structurally, the subsea connection unit is comprised of a base structure and a connector assembly. The connector assembly is attached to the end of a first flowline (or flowline bundle) which is to be connected to a complementary second flowline (or flowline bundle). The second flowline is affixed to the base structure which rests on the marine bottom. A pull-down line is connected to the connector assembly and extends downward through the base structure and back to the surface.

A cone on the connector assembly mates with a cone receiver on the base structure to align the flowlines with respect to each other when the connector assembly is in place on the base structure. A guide assembly is provided on the base structure to direct the cone on the connector assembly into the cone receiver as it is drawn onto the base structure by means of the pull-down line.

Fluid controls on the connector assembly actuate power mechanisms carried by the connector assembly (1) to lock the connector assembly onto the base structure, (2) to move the end of the first flowline into abutment with the end of the second flowline, (3) to close a clamp means carried by the connector assembly to secure the connection between the flowlines, and (4) to release the pull-down line from the connector assembly for recovery to the surface.

By providing all of the controls and actuating mechanisms on the connector assembly, the base structure and the second flowline can be positioned and left on the marine bottom without the need for continuously maintaining communication links to the surface for the controls. This can be very important where the subsea connection is to be made in rough seas or where the first flowline is not going to be connected to the second flowline until some much later date.

BRIEF DESCRIPTION OF THE DRAWINGS

The actual construction, operation, and apparent advantages of the present invention will be better understood by referring to the drawings in which like numerals identify like parts and in which:

FIG. 4 is a top view of the connector assembly of the subsea connector unit of FIG. 1;

FIG. 5 is an elevational view, partly in section, of the connector assembly of FIG. 4;

FIG. 6 is a view taken along section 6—6 of FIG. 5;

FIG. 8 is an exploded, partial view of the clamp means of the connector assembly along with the flowlines to be connected.

DESCRIPTION OF THE PREFERRED EMBODIMENT

Figure 1:
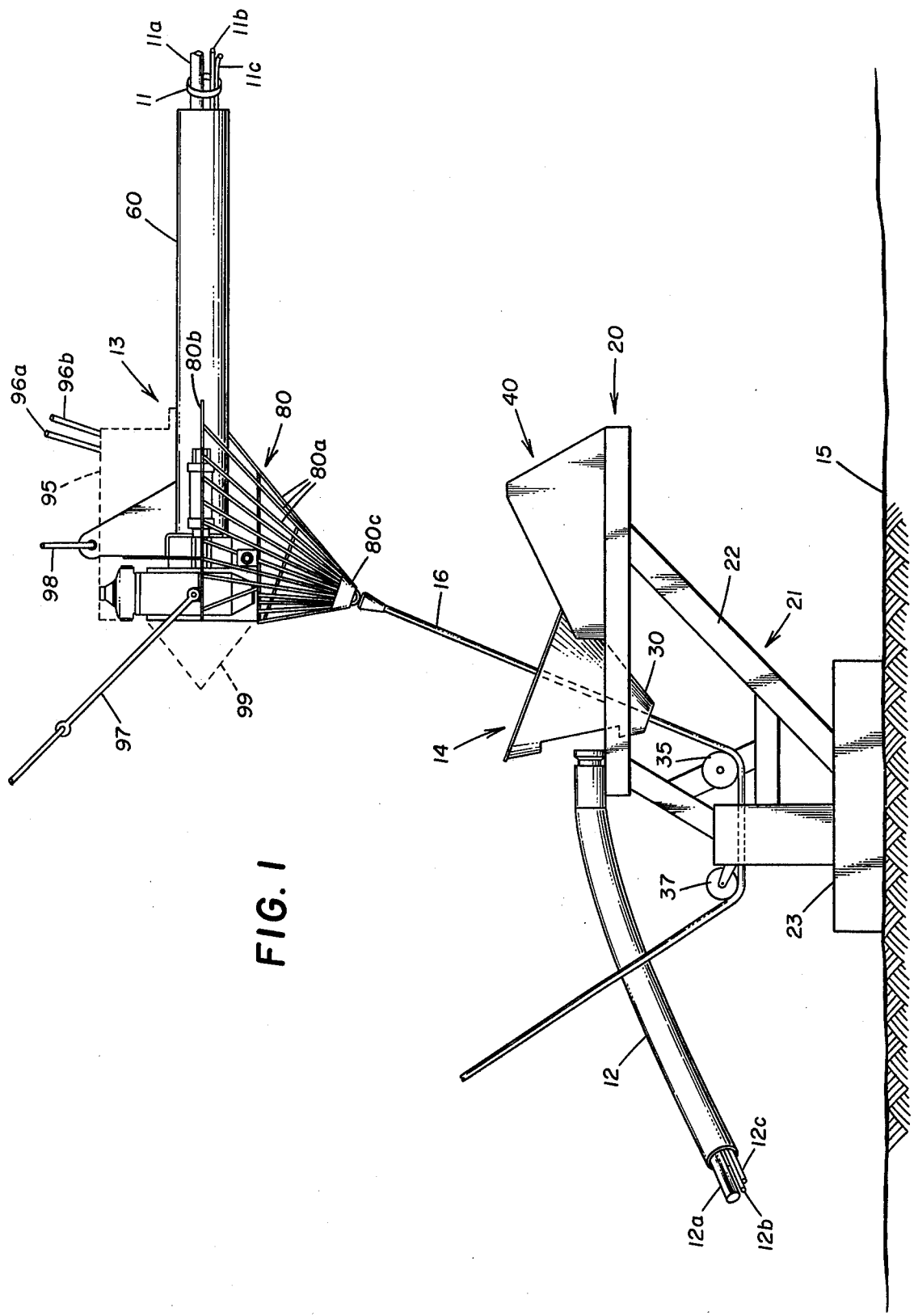
FIG. 1 is a perspective view of the subsea connection unit of the present invention.

Referring more particularly to the drawings, FIG. 1 discloses a subsea connection unit 10 for remotely connecting a set of flow passages, e.g., a flowline or bundle of flowlines 11 to a previously positioned, complementary set of flow passages, e.g., a bundle of submerged flowlines 12. Unit 10 is comprised of base structure 14 and mating connector assembly 13. Base structure 14 is adapted to be positioned on marine bottom 15 and to have the end of flowline bundle 12 affixed thereto. Connector assembly 13 is connected to the end of flowline bundle 11. Pull-down line 16 is connected to connector assembly 13 and passes down through base structure 14 and back to the surface. As will be explained in more detail below, connector assembly 13 is drawn into base structure 14 by means of pull-down line 16 where flowline bundle 11 is connected to flowline bundle 12.

Figure 2:
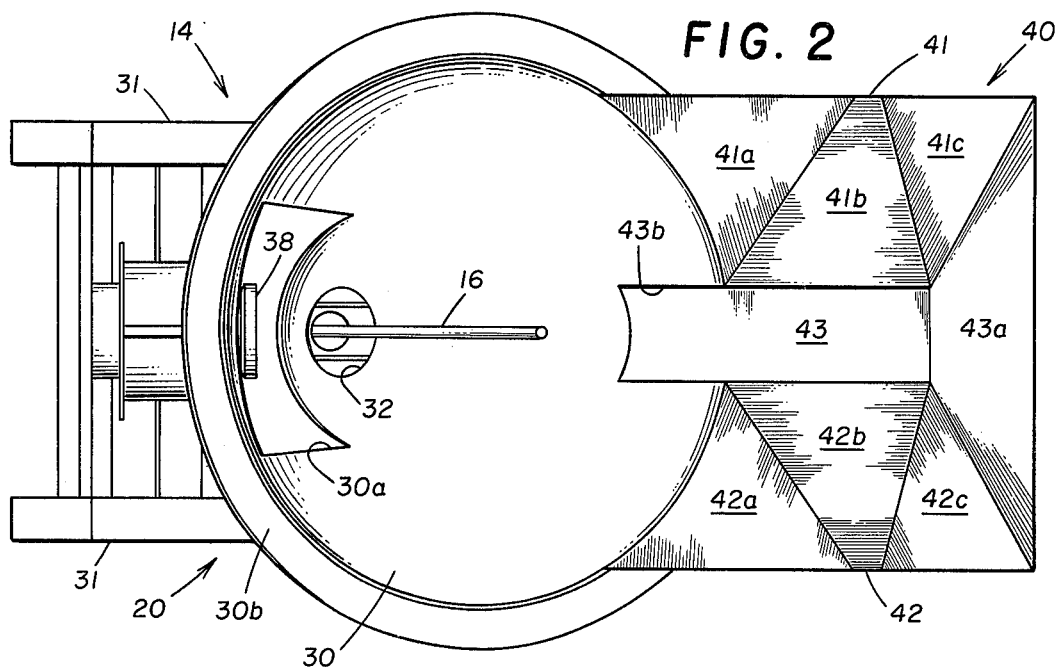
FIG. 2 is a top view of the base structure of the subsea connection unit of FIG. 1.
Figure 3:
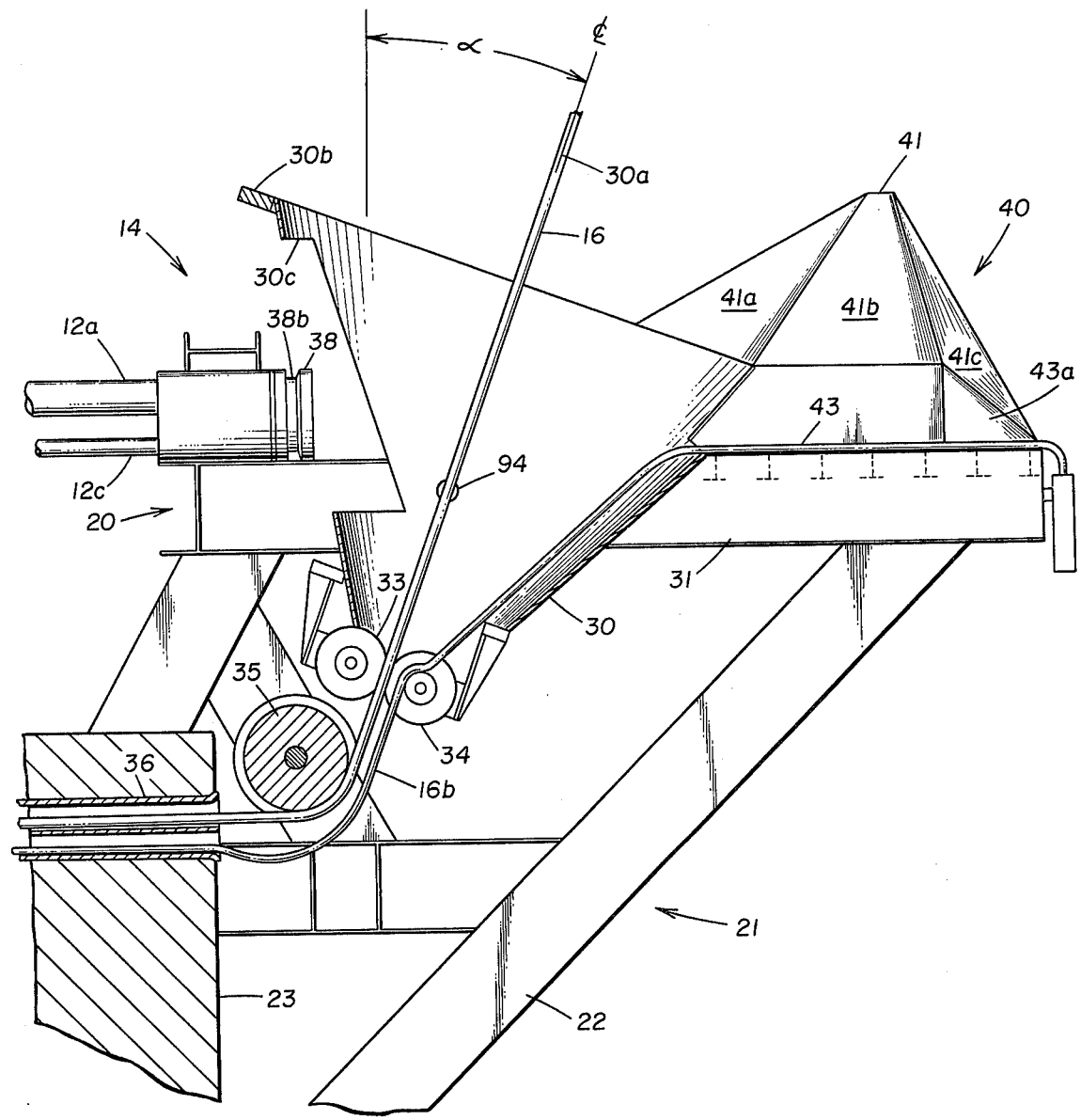
FIG. 3 is an elevational view, partly in section, of the base structure of FIG. 2.

Referring now to FIGS. 2 and 3, base structure 14 is comprised of guide platform 20 which is mounted on support means 21. Support means 21 is illustrated as a skeletal framework 22 mounted on pedestal 23, but it should be recognized that guide platform 20 could just as easily be mounted on or form part of (1) a submerged wellhead, (2) a manifolding structure for a plurality of submerged wellheads, or (3) any submerged structure which involves flow passages which are to be coupled to a complementary set of passages.

Guide platform 20 is comprised of receiver cone 30 which is mounted on members 31 so that the open, upper end of cone 30 presents an unobstructed entry for connector assembly 12. An opening 32 is provided in the lower end or apex of receiver cone 30 along center line 30a of cone 30 to allow pull-down line 16 to pass therethrough. A pair of idler guide wheels 33, 34 are diametrically aligned on either side of opening 32 and are journaled on cone 30 to maintain pull-down line 16 in a centered position and to allow it to be easily pulled through cone 30. Another idler wheel 35 is journaled on support means 21 and guides pulldown line 16 into guide sleeve 36 or the like in pedestal 23. As shown in FIG. 1, pull-down line 16 passes over still another idler wheel 37 after it passes through sleeve 36 and extends back to the surface to be attached to a pulling source (not shown). Again, it should be recognized that the configuration of idler wheels 35, 37 and sleeve 36 could be replaced with similar apparatus, e.g., a J-tube, without departing from the present invention.

Flowline bundle 12 is affixed to guide platform 20 so that flange 38 on the end of bundle 12 is aligned with window 30c which is cut in cone 30. By extending the end of bundle 12 slightly through window 30a (see FIG. 2), the upper part 30b of cone 30 provides protection for flange 38 during draw-down of connector assembly 13.

To provide proper alignment of connector assembly 13 on base structure 14, receiver cone 30 is canted at a slight angle α (FIG. 3), e.g., 20° from the vertical, and a special guide assembly 40 is mounted on guide platform 20 adjacent the dipping edge of cone 30. Guide assembly 40 is comprised of two symmetrical structures 41, 42, which are mirror images of each other and which define an elongated slot 43 therebetween. Slot 43 flares outward at its rearward edge 43a, as shown in FIG. 2. A slot 43b is cut in cone 30 to effectively extend slot 43 into cone 30. Each of symmetrical structures 41, 42 is comprised of three sloping surfaces 41a, 41b, 41c, and 42a, 42b, 42c, respectively. Surfaces 41a and 42a slope downward toward the lip of cone 30; surfaces 41b and 42b slope downward toward slot 43; and surfaces 41c and 42c slope downward toward the flared portion 43a of slot 43. The purpose of guide assembly 40 will be described in more detail in the description of the operation of subsea connector unit 10 which follows below.

Referring now to FIGS. 4–8, connector assembly 13 is comprised of housing 60 having hollow mandrel 61 slidably mounted therein. Mandrel 61 has one or more splines 62 (FIG. 5) which mate with one or more slots 63 on housing 60 to permit longitudinal movement between housing 60 and mandrel 61 but to prevent rotational movement therebetween. Flowline bundle 11 passes through mandrel 61 and is coupled thereto by means of tongue 61a which mates with groove 64a on flange 64 which, in turn, is affixed to the end of bundle 11. This allows the flange 64 to rotate with respect to mandrel 61 which may be necessary to align flowline bundles 11, 12 before they are finally connected, as explained below.

Forming the forward end of mandrel 61 is case 65 which encloses clamp means 66. Clamp means 66 is comprised of two sections 67, 68 each of which, in turn, is comprised of two symmetrically halves 67a, 67b, and 68a, 68b, respectively. To provide desired flexibility, halves 67a, 67b, and 68a, 68b are pivotably connected by links 67c, 68c, respectively. Pivotably secured in each of ears 67d, 67e of section 67 and ears 68d, 68e of section 68 (FIG. 7) is a threaded follower 69 (FIG. 8). Threaded members 70, 71 are threaded through the followers in ears 67d, 68d, and 67e, 68e, respectively, and are rotatably driven by fluid actuated motors 72, 73, respectively, which are mounted on case 65. Chain 71b cooperates with gears 70a and 71a (FIG. 7) on screws 70, 71, respectively, to synchronize the rotation of the two threaded members so that sections 67 and 68 will move together smoothly to a closed position and will not bind.

Clamp means 66 has a first annular projection 65a on its inner surface which is adapted to mate with groove 64b on flange 64 (FIG. 5) and a second annular projection 65b which is adapted to mate with groove 38b on flange 38 when clamp means 66 is in proper position relative to said flanges.

Fluid actuated power means 74, e.g., hydraulic cylinders, are diametrically positioned on either side of housing 60, with the cylinders of said means being connected to housing 60 by pins 74a, and the pistons of said means being connected to mandrel 61 by pins 74b.

Guide cone 80 is secured to housing 60 and extends downward therefrom. As illustrated, cone 80 is comprised of a plurality of struts 80a connected to ring 80b at their one end and to apex block 80c at their other end. Cone 80 is preferably constructed in this manner to reduce weight and to provide a better hydrodynamic configuration for towing while still effectively functioning in the same manner as a solid cone. The external configuration and angle of cant of guide cone 80 is designed to conform to the interior configuration and angle of cant of guide receiver cone so that the two will properly mate when connector assembly 13 is drawn onto base structure 14.

A terminal, e.g., turnbuckle 16a or the like, is connected to the end of draw-down line 16 and passes through an opening in apex block 80c where it is connected to guide cone 80 by means of releasable latch means 82. As best seen in FIGS. 5 and 6, latch means 82 is comprised of two spaced, parallel plates 83, 84 which are affixed to cone 80. Latch pin 85 is affixed to element 86 and slidably extends through openings in both plates 83, 84 when in a latched position as shown in FIGS. 5 and 6. Two fluid actuated power means 87 and 88, e.g., hydraulic cylinders, are attached to plate 84. The respective piston rods 89, 90 of means 87, 88 pass through openings in plate 84 and are attached to element 86. Latch means 82 operates as follows.

Piston rods 89, 90 are fully extended to move element 86 and attached latch pin 85 to an unlatched position (not shown). The eye in turnbuckle 16a is aligned with the openings in plates 83, 84; and rods 89, 90 are retracted to move latch pin 85 through the opening in plate 84, the eye in turnbuckle 16a, and through the opening in plate 83, thereby latching pull-down line 16 to connector assembly 13.

Also mounted on connector assembly 13 is a pair of diametrically opposed lockpins 92, 93 which are operated by fluid actuated power means, e.g., hydraulic cylinders 92a (FIG. 5). These pins cooperate with diametrically opposed passages 94 (only one shown in FIG. 3) in receiver cone 30 to lock connector assembly 13 to base structure 14 when the two are in proper alignment.

Figure 7:
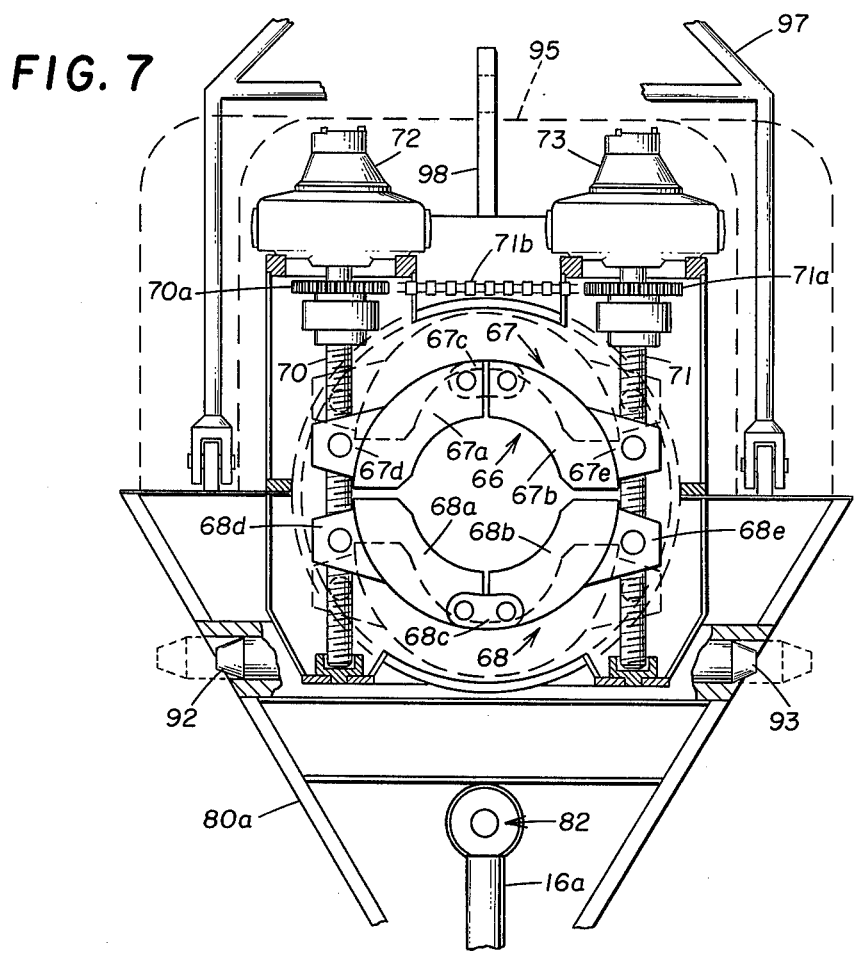
FIG. 7 is a frontal view of the connector assembly of FIG. 4.

A fluid supply package 95, e.g., hydraulic or pneumatic, represented by dotted lines in FIGS. 1 and 7 is removably mounted on connector assembly 13 and has supply lines 96a, 96b which extend to the surface for circulating fluid through package 95. Package 95 provides the necessary valving, etc., required for operating the fluid power equipment on assembly 13 as will be explained in more detail below. Yoke 97 is mounted on connector assembly 13 to provide means for connecting a towing or tensioning cable thereto. Also, lug 98 is provided on assembly 13 for connecting a buoyancy means (not shown) to connector assembly, if desired or required for a particular installation technique. A hydrodynamic nose structure 99 (FIG. 1) may be removably attached to connector assembly 13, if desired, to improve the towing characteristics of connector assembly 13 and flowline bundle 11 as they are towed to the installation site. Nose structure 99, if used, will normally be removed before connector assembly 13 is drawn down onto base structure 14.

The operation of subsea connector unit 10 is as follows. As flowline bundle 12 (e.g., large conduit 12a and two small conduits 12b, 12c attached together) is being laid, flange 38 is affixed to the end of bundle 12 which, in turn, is affixed to base structure 14. Base structure 14 is then lowered with flowline bundle 12 onto marine bottom 15. Pulldown line 16 is prethreaded through base structure 14 before it is positioned on the marine bottom and is of adequate length so that both ends extend to the surface. As shown in FIG. 3, a second or emergency pull-down line 16b may also be prethreaded through base structure 14 and is available in the event primary pull-down line 16 is broken during installation.

When it is desired to couple flowline bundle 12 to a complementary flowline bundle 11 (also comprising complementary large conduit 12a and two small conduits 12b, 12c attached together), the ends of pull-down lines are retrieved. One end of line 16 is attached to cone 80 of connector assembly 13 and the other end is attached to a pulling source on the surface, e.g., tug, barge, winch, etc. If an installation technique similar to that disclosed in U.S. Pat. No. 3,698,348 is being carried out, buoyancy control means (not shown) may be connected to lug 98 and proper tensioning may be maintained by connecting a line (not shown) to yoke 97.

Force is applied to pull-down line 16 to draw connector assembly down onto base structure 14. As guide cone 80 approaches base structure 14, apex block 80c will either directly enter guide receiver cone 30 or it will contact one of the sloping surfaces of guide assembly 40. If apex block 80c contacts either surface 41a or 42a, continued pulling on pull-down line 16 will pull cone 80 into receiver cone 30. If apex block 80c contacts either surface 41b or 42b, cone 80 will be pulled down into elongated slot 43, through slot 43b, and into cone 30. If apex block 80c contacts either surface 41c or 42c, cone 80 will be pulled down into flared portion 43a, through slot 43 and slot 43b, and into cone 30. As guide cone 80 moves downward into receiver cone 30, housing 60 of connector assembly 13 contacts the sloping surfaces of guide assembly 40 and is lined up into slot 43. The height and width of slot 43 is approximately equal, i.e., only slightly larger than the diameter of housing 60, so that when guide cone 80 is seated in guide receiver cone 30, housing 60 will be securely held in slot 43. This insures proper pitch and yaw alignment of connector assembly 13 with respect to base structure 14 and will properly align flange 64 with flange 38.

Fluid, e.g., hydraulic fluid, is circulated from the surface through lines 96a, 96b to fluid supply package 95. The valving in package 95 is sequenced so that cylinders 92a are first actuated to move lock pins 92, 93 into passages 94 on cone 30 to lock connector assembly 13 onto base structure 14. When the pressure in cylinders 92a for pins 92, 93 reaches the value required to insure locking, fluid is automatically diverted to power means 74 to move case 65 and flange 64 relative to housing 60 and into abutment with flange 38 on base structure 14. Of course, the proper sealing means, e.g., 101 (FIG. 8), may be incorporated onto either flange 64 or 38 to provide the proper fluid seals between the mating conduits as is known in the art. Alignment pins 103 in flange 64 mate with alignment holes 104 in flange 38 to slightly rotate flange 64, if necessary, to provide the final alignment between conduits 11a and 12a, 11b and 12b, and 11c and 12c.

The desired pressure having been attained in power means 74, valving in package 95 now switches fluid flow to fluid motors 72, 73 which rotate threaded members 70, 71, respectively, to move sections 67, 68 of clamp means 66 together to a closed position. Annular projections 65a, 65b move simultaneously into grooves 64b and 38b, respectively, to securely connect flowline bundle 11 to flowline bundle 12. Continued fluid flow to package 95 now actuates fluid power means 87, 88 to unlatch pull-down line 16 which may then be recovered to the surface. Supply package 95 may now be removed from connector assembly 13 and returned to the surface.

If it is ever desired to disconnect the flowline bundles, a fluid supply package (not shown) similar to package 95 but programmed in reverse can be installed on connector assembly 13 by divers, a submerged work vessel, or the like. Fluid is supplied and the above-described sequence is carried out in reverse to disconnect subsea connection unit 10. Of course, underwater television cameras and lights (not shown) may be positioned on connector assembly 13 to transmit pictures to the surface during the installation operation, if desired, as is shown in the art. If used, the cameras and lights are preferably releasably mounted on the connector assembly so that they may be recovered once the subsea connection is secured.

What is claimed is:

1. A subsea connection unit for remotely connecting a first flowline to a complementary second flowline at a submerged location, said unit comprising:
    a base structure adapted to be positioned at said submerged location;
    means to affix said complementary second flowline to said base structure;
    guide receiver means on said base structure;
    a connector assembly adapted to be connected to said first flowline;
    guide means on said connector assembly;
    a pull-down means attached to said connector assembly and passing through said base structure for pulling said connector assembly onto said base structure;

guide assembly means on said base structure adjacent said guide receiver means for directing said guide means on said connector assembly into said guide receiver means when said connector assembly is drawn onto said base structure;

means on and carried by said connector assembly to move the end of said first flowline into proper abutment with the end of said complementary flowline when said connector assembly is in position on said base structure; and means to connect said first and second flowlines to each other.

2. The subsea connection unit of claim 1 including:
means for locking said connector assembly to said base structure when said connector assembly is in position on said base structure.

3. The subsea connection unit of claim 2 wherein said locking means comprises:
at least one locking pin carried by said connector assembly;
fluid actuated means for moving said at least one locking pin between a locked and an unlocked position; and
a passage on said base structure adapted to receive said at least one locking pin when said connector assembly is in proper position on said base structure.

4. The subsea connection unit of claim 2 wherein said means on said connector assembly for moving said first flowline into abutment with said complementary flowline comprises:
fluid actuated power means.

5. The subsea connection unit of claim 2 including:
a first flange connected to the end of said first flowline having an annular groove in the external surface thereof; and
a second flange connected to the end of said second flowline having an annular groove in the external surface thereof;
and wherein said means for securing said ends of said first and second flowlines together comprises:
clamp means comprising:
a first section and a second section, said sections when in a closed position having a first annular projection adapted to mate with said groove in said first flange and a second annular projection adapted to mate with said groove in said second flange; and
means for moving said sections between open and closed positions.

6. The subsea connection unit of claim 5 wherein said means for moving said sections comprises:
a pair of threaded followers positioned diametrically opposed on each of said sections;
a pair of threaded members, each of said members cooperating with one of said pair of followers on each of said sections; and
fluid actuated power means for rotating said threaded members.

7. The subsea connection unit of claim 6 wherein said guide receiver means comprises:
a hollow first cone-shaped member mounted on said base member, said cone-shaped member having an open upper end;
and wherein said guide means on said housing comprises:

a second cone-shaped member having an exterior configuration to conform to the interior configuration of said hollow cone-shaped member;
and wherein said pull-down line passes through an opening in the apex of said hollow first cone-shaped member.

8. The subsea connection unit of claim 7 including:
an opening defining a window through the wall of said hollow first cone-shaped member, said flange on complementary second flowline extending into said hollow first cone-shaped member through said window.

9. The subsea connection unit of claim 8 wherein said guide assembly means on said base structure comprises:
a pair of symmetrically structures positioned adjacent said hollow first cone-shaped member and defining an elongated slot therebetween which extends into said hollow first cone-shaped member, each of said symmetrical structures having a plurality of sloping surfaces for directing the apex of said second cone-shaped member either directly into said hollow first cone-shaped member or into said elongated slot between said symmetrical structures.

10. The subsea connection unit of claim 9 including releasable latch means for connecting said pull-down line to the apex of said second cone-shaped member, said latch means comprising:
a terminal attached to the end of said pull-down line, said terminal having an eye therethrough;
a latch pin carried by said second cone-shaped member adapted to pass through said eye on said terminal when in a latched position; and
fluid actuated means for moving said latch pin between latched and unlatched positions.

11. The subsea connection unit of claim 10 wherein said first flowline comprises:
a plurality of first flow conduits forming a first flowline bundle;
and wherein said complementary second flowline comprises:
a plurality of second flow conduits forming a second flowline bundle, said second flow conduits being complementary to said first flow conduits.

12. A subsea connection unit for remotely connecting a first flowline to a complementary second flowline at a submerged location, said unit comprising:
a base structure adapted to be positioned at said submerged location;
means to affix said complementary second flowline to said base structure;
a guide receiver means on said base structure;
a connector assembly adapted to be connected to said first flowline, said connector assembly comprising:
a housing;
a mandrel slidably mounted in said housing;
means for connecting said end of said first flowline to said mandrel;
means for moving said mandrel relative to said housing;
means carried by said mandrel for securing said first and second flowlines together when in proper position;
guide means on said housing for mating with said guide receiving means on said base structure; and
a pull-down line connected to said connector assembly and extending through said base structure for drawing said connector assembly onto said base structure.

13. The subsea connection unit of claim 12 including:
means for locking said connector assembly to said base structure when said connector assembly is in position on said base structure.

14. The subsea connection unit of claim 13 wherein said locking means comprises:
at least one locking pin carried by said connector assembly;
fluid actuated means for moving said at least one locking pin between a locked and an unlocked position; and
a passage on said base structure adapted to receive said at least one locking pin when said connector assembly is in proper position on said base structure.

15. The subsea connection unit of claim 13 wherein said means for moving said mandrel relative to said housing comprises:
fluid actuated power means.

16. The subsea connection unit of claim 13 including:
a first flange connected to the end of said first flowline having an annular groove in the external surface thereof; and
a second flange connected to the end of said second flowline having an annular groove in the external surface thereof;
and wherein said means for securing said ends of said first and second flowlines together comprises:
clamp means comprising:
a first section and a second section, said sections when in a closed position having a first annular projection adapted to mate with said groove in said first flange and a second annular projection adapted to mate with said groove in said second flange; and
means for moving said sections between open and closed positions.

17. The subsea connection unit of claim 16 wherein said means for moving said sections comprises:
a pair of threaded followers positioned diametrically opposed on each of said sections;
a pair of threaded members, each of said members cooperating with one of said pair of followers on each of said sections; and
fluid actuated power means for rotating said threaded members.

18. The subsea connection unit of claim 15 wherein said means for moving said mandrel relative to said housing comprises:
fluid actuated power means.

19. The subsea connection unit of claim 18 including:
a guide assembly means on said base structure for guiding said guide means on said housing into said guide receiver means on said base structure when said connector assembly is drawn onto said base structure.

20. The subsea connection unit of claim 17 wherein said guide receiver means comprises:

a hollow first cone-shaped member mounted on said base member, said cone-shaped member having an open upper end;
and wherein said guide means on said housing comprises:
a second cone-shaped member having an exterior configuration to conform to the interior configuration of said hollow cone-shaped member;
and wherein said pull-down line passes through an opening in the apex of said hollow first cone-shaped member.

21. The subsea connection unit of claim 20 including:
an opening defining a window through the wall of said hollow first cone-shaped member, said flange on complementary second flowline extending into said hollow first cone-shaped member through said window.

22. The subsea connection unit of claim 21 wherein said locking means comprises:
at least one locking pin carried by said second cone-shaped member on said connector assembly;
fluid actuated means for moving said at least one locking pin between a locked and an unlocked position; and
a passage in said hollow first cone-shaped member adapted to receive said at least one locking pin when said connector assembly is in proper position on said base structure.

23. The subsea connection unit of claim 22 wherein said guide assembly means on said base structure comprises:
a pair of symmetrical structures positioned adjacent said hollow first cone-shaped member and defining an elongated slot therebetween which extends into said hollow first cone-shaped member, each of said symmetrical structures having a plurality of sloping surfaces for directing the apex of said second cone-shaped member either directly into said hollow first cone-shaped member or into said elongated slot between said symmetrical structures.

24. The subsea connection unit of claim 23 including releasable latch means for connecting said pull-down line to the apex of said second cone-shaped member, said latch means comprising:
a terminal attached to the end of said pull-down line, said terminal having an eye therethrough;
a latch pin carried by second cone-shaped member adapted to pass through said eye on said terminal when in a latched position; and
fluid actuated means for moving said latch pin between latched and unlatched positions.

25. The subsea connection unit of claim 24 wherein said first flowline comprises:
a plurality of first flow conduits forming a first flowline bundle;
and wherein said complementary second flowline comprises:
a plurality of second flow conduits forming a second flowline bundle, said second flow conduits being complementary to said first flow conduits.

* * * * *